United States Patent Office 2,968,545
Patented Jan. 17, 1961

2,968,545
PROCESS FOR PRODUCING PHOSPHATE-CONTAINING FERTILIZERS

Hugo Nees, Koln-Bruck, and Martin Schmidt, Koln-Kalk, Germany, assignors to Chemische Fabrik Kalk, G.m.b.H., Koln-Kalk, Germany No Drawing. Filed July 8, 1957, Ser. No. 670,384

9 Claims. (Cl. 71—39)

This invention relates to an improved process for producing phosphate-containing fertilizers with a diminished mole ratio of CaO to $P_2O_5$ from that contained initially in the phosphate rock by treating phosphate rock with nitric acid sufficient to render water soluble practically the entire quantity of phosphate initially contained in said phosphate rock, ammoniating the disintegration mixture and during the ammoniation adding stabilizing metal ions to the mass.

The adjustment of said diminished mole ratio of CaO to $P_2O_5$ is effected in well-known manner by adding to the disintegration mixture or to the ammoniation mixture or to both, ammonium phosphates or potassium phosphates or both in such quantity actually necessary to adjust the desired mole ratio, preferably in conjunction with an addition of ammonium sulphate or potassium sulphate or of both salts.

The mole ratio of CaO to $P_2O_5$ is preferably so adjusted that in the final product to every 1 mol $P_2O_5$ there is a quantity of 1.5 to 2.1 mol CaO, not including such CaO which is generally present in the form of calcium fluoride and further such CaO which is incidently present in the form of calcium sulphate. Consequently even in the case of the mole ratio of $CaO/P_2O_5=2:1$ the corresponding quantity of CaO present in the mass is not larger than that necessary for converting the entire quantity of $P_2O_5$ present in the mass into dicalcium phosphate during the ammoniation step, whereas when adjusting to the lower ratios it is possible to form water-soluble monocalcium phosphate in addition to dicalcium phosphate.

It is well known that it is difficult to carry out the ammoniation of the nitrous disintegration solution so that the phosphoric acid contained in the final product is practically entirely soluble in the ammonium citrate solution and remains so even if the fertilizer is stored for a long period.

To overcome this difficulty numerous suggestions have been made. One of these suggestions, according to the U.S. Patent No. 2,739,054, consists in adding to the disintegration mixture, prior to the ammoniation step, equivalent quantities of magnesium and sulphate ions, so that there are at least 20 molecules of magnesium and 20 molecules of $SO_4$ to 100 molecules of $P_2O_5$.

To attain the same object in the French Patent No. 1,043,483, the owner of which is identical with the owner of the above-mentioned U.S. patent, iron(II)-ions are added in such quantities that there are at least 20 molecules of iron to 100 molecules of the total of the phosphoric acid. The same place of introduction and the same mole relationship is claimed by the same owner for the above-mentioned purpose in the French Patent No. 1,062,974 regarding the addition of iron(II)-ions and in the Swiss Patent No. 300,032 regarding the addition of aluminium ions.

This invention relates to the preparation of complex fertilizers containing nitrogen in the form of nitrates and nitrogen in ammoniated form and phosphoric acid in the form of phosphates completely soluble in ammonium citrate and in which the mole ratio of CaO to $P_2O_5$ is between 1:5 and 2:1, not including such CaO which is generally present in the form of calcium fluoride and further such CaO which is incidently present in the form of calcium sulphate. Said complex fertilizers are obtained according to the invention by treating phosphate rock with nitric acid, ammoniating the disintegration mixture, and during the ammoniation treatment when the pH is between 2.5 and 6.7, adding a minor quantity of stabilizing metal ions to the mass. The desired mole ratio of CaO to $P_2O_5$ between 1.5 and 2.1 is adjusted—as above-mentioned—by adding to the disintegration mixture or to the ammoniation mixture or to both mixtures a suitable quantity of ammonium phosphate.

When in this specification and in the appended claims the term "stabilizing metal ions" is used it is intended to refer to one or more of the following ions: magnesium-, aluminium-, iron(II)- and iron(III)-ions.

A practically complete stabilisation of the phosphoric acid is obtained if said stabilising metal ions are added to the ammoniation mixture at a pH value of 2.5 to 6.7 preferably 5.0 to 6.4, in such quantities that there are 1 to 5 preferably 2 to 4 molecules of said stabilizing metal to 100 molecules of $P_2O_5$ present in the mass. In the process according to the invention, therefore, much smaller quantities of stabilizing metal ions are required than were hitherto necessary for obtaining the same effect. In consequence of the smaller quantities of stabilizing metal ions applied at the process according to the invention than applied at the processes of prior art there are obtained more liquid and, therefore, better workable ammoniation mixtures than such obtained hitherto.

The ions of each of the above-mentioned metals can be used alone or together with those of one or more of the other metals mentioned. It has been found particularly advantageous as regards the stabilizing effect to use magnesium ions in conjunction with aluminium ions. By this means certain favorable mixture proportions can be introduced for stabilizing the dicalcium phosphate. Thus, for example in the case of the joint use of magnesium and aluminium ions the most advantageous mole ratio of Mg to Al is from 2:1 to 1:1.

It has further been found that for the stabilizing metal ions the ammoniating mixture should preferably have certain optimum pH values when they are introduced. For example, the magnesium ions are preferably introduced when the pH value is about 3 to 6.4; aluminium ions or iron ions when it is about 5.4 to 6.4.

That in the process according to the invention considerably smaller quantities of stabilizing metal ions are required than was necessary hitherto for obtaining the same effect, is due to the fact that in the process according to the invention a much more suitable place is chosen for introducing the stabilizing metal ions than was hitherto the case. If, for example, the magnesium, aluminium, iron(II)- or iron(III)-ions are added to the disintegration mixture—as was previously proposed—that is, before the introduction of the neutralizing agent, a precipitation of silicates and other compounds of the stabilizer cation takes place even before the precipitation of the dicalcium phosphate which is to be protected by the stabilization, so that a considerable quantity of the added stabilizing metal ions is no more available for the stabilizing action. If, on the other hand, the said stabilizing metal ions are added after the neutralization of the disintegration mixture is completed, the stabilizer does not become active.

The stabilizing metal ions are added to the ammoniating mixture in the form of their compounds which are soluble in the reagent, especially in the form of their sulphates, nitrates or chlorides.

The ions of one or more of the above-mentioned metals can also be added in the form of acid or alkaline disintegration products of such substances, especially mineral substances which contain one or more of the above-mentioned metals, preferably in a suitable quantitative ratio.

It has been discovered that in the production of N–P–K composite fertilizers, both the ammoniating process and also the stabilization are considerably assisted by the fact that the technical potash salts of commercial quality are added to the ammoniating mixture, not after the termination of the ammoniating process but during the ammoniating process at pH values of 4 to 6.4, preferably 4.5 to 6. Either a portion or even the entire quantity of commercial potash salt which is required for producing a certain $K_2O$ content in the composite fertilizer, can be introduced into the ammoniating mixture at the above-mentioned pH values.

The process according to the invention can be carried out intermittently or continuously. If the process is continuous the ammoniation is preferably carried out in several containers connected in series and which are equipped with suitable intermixing devices. Certain pH value stages, rising from the first to the last container, are obtained by suitable regulation of the ammonia feed to the individual containers, the addition of the stabilizer metal ions preferably taking place, according to the number of ammoniating containers used, in that container in which the contents have the pH value most suitable for activating the particular stabilizer.

Example 1

242 kg. of Morocco phosphate containing 32.5% $P_2O_5$ is disintegrated at a temperature between 35 and 40° C. with 610 kg. of nitric acid (52%).

A hot saturated aqueous solution containing 132 kg. of diammonium-phosphate is added to the disintegration mixture. Then 56 kg. of ammonia is introduced into the mixture obtained under intensive stirring. As soon as the reaction mixture has reached a pH value of about 4.8, 9 kg. of crystallized magnesium sulphate ($MgSO_4.7H_2O$) is added.

When the ammoniating process has been terminated (pH value of about 7.0) the slightly pasty mass is mixed with a suitable amount of the resultant material of small particle size, i.e. "fines," granulated, and dried in the known manner.

A composite fertilizer with a content of 18.5% N and 18.5% $P_2O_5$ is obtained. Of the total quantity of phosphoric acid, 98.7% is soluble in ammonium citrate solution.

The addition of the diammonium-phosphate can also be effected by adding about one half of the saturated aqueous solution to the disintegration mixture and the other half to the ammoniation mixture when the pH therein is between pH 4 and 5.

Example 2

The same amounts of crude phosphate, diammonium phosphate and nitric acid are used as in Example 1.

The procedure is the same as in Example 1, with the difference that, when the ammoniating mixture has reached a pH value of about 5.8, 12 kg. of crystallized aluminium sulphate ($Al_2(SO_4)_3 + 18H_2O$) is added.

The slightly pasty mixture (pH value 6.9), after a suitable amount of "fines" has been added, is granulated and dried in the known manner.

A composite fertilizer with a content of 18.5% N and 18.5% $P_2O_5$ is obtained. Of the total quantity of phosphoric acid, 98.7% is soluble in ammonium citrate solution.

Example 3

The same amounts of crude phosphate, diammonium phosphate and nitric acid are used as in Example 1.

The procedure is the same as in Example 1, with the difference that, when the ammoniating mixture has reached a pH value of about 3.8, 7 kg. of crystallized magnesium nitrate is added. On attaining a pH value of 6.0, 10 kg. of crystallized aluminium nitrate is introduced into the mass.

The ammoniating mixture (pH value 6.8) is granulated and dried in the known manner, after a suitable amount of "fines" has been added.

A composite fertilizer with a content of 18.5% N and 18.5% $P_2O_5$ is obtained. Of the total quantity of phosphoric acid, 99.0% is soluble in ammonium citrate solution.

Example 4

The same amounts of crude phosphate, diammonium phosphate and nitric acid are used as in Example 1.

A hot saturated aqueous solution containing 132 kg. of diammonium phosphate is added to the disintegration mixture. Then 56 kg. of ammonia is introduced into the mixture obtained under intensive stirring. As soon as the ammoniating mixture has reached a pH value of 5.0, 8 kg. of crystallized magnesium chloride ($MgCl_2.6H_2O$) is added. On attaining a pH value of 6.4, 350 kg. of technical potassium chloride is introduced into the ammoniating mixture.

The free flowing mass (pH value 7.0) is mixed with a suitable amount of "fines," granulated, and dried in the known manner.

A composite fertilizer with a content of 12% N, 12% $P_2O_5$ and 20% $K_2O$ is obtained. Of the total phosphoric acid, 99.0% is soluble in ammonium citrate solution.

Example 5

The same amounts of crude phosphate, diammonium phosphate and nitric acid are used as in Example 4.

The procedure is the same as in Example 4, with the difference, that, when the ammoniating mixture has reached a pH value of about 5.9, 11 kg. of crystallized iron(II)-sulphate ($FeSO_4.7H_2O$) is added. On attaining a pH value of about 6.3, 240 kg. of technical potassium chloride are introduced into the ammoniating mixture.

The free flowing mass (pH value 7.0) is mixed with a suitable amount of "fines," granulated, and dried in the known manner.

A composite fertilizer with a content of 13% N, 13% $P_2O_5$ and 13% $K_2O$ is obtained. Of the total phosphoric acid, 98.8% is soluble in ammonium citrate solution.

Example 6

238 kg. of Morocco phosphate, containing 33% $P_2O_5$, is disintegrated at a temperature of 45–50° C. with 610 kg. of nitric acid (52%).

74 kg. of ammonia is introduced into the disintegration mixture under vigorous stirring. A hot saturated aqueous solution containing 118 kg. of monoammonium phosphate is added to the ammoniating mixture on attaining a pH value of about 2.4, and 8 kg. of hydrated magnesium chloride on attaining a pH value of about 5.0.

When the ammoniating process is terminated the slightly pasty mass (pH value about 6.8) is mixed with a suitable quantity of the resultant material of small particle size, i.e. "fines," and granulated and dried in the known manner.

A composite fertilizer with a content of 18.5% N and 18.5% $P_2O_5$ is obtained. Of the total quantity of phosphoric acid, 98.8% is soluble in ammonium citrate solution.

Example 7

The came amounts of crude phosphate, monoammonium phosphate and nitric acid are used as in Example 6.

The procedure is the same as in Example 6, with the only difference that 7.5 kg. of crystallized magnesium sulphate is added to the ammoniating mixture when attaining a pH value of about 4.2 and 8.8 kg. of crystallized aluminium sulphate when attaining a pH value of about 6.2.

The ammoniating mixture (pH value 6.8), after a suitable quantity of "fines" has been added, is granulated and dried in the known manner.

Again a composite fertilizer with a content of 18.5% N and 18.5% $P_2O_5$ is obtained. Of the total quantity of phosphoric acid, 99.0% is soluble in ammonium citrate solution.

*Example 8*

The same amounts of crude phosphate and nitric acid are used as in Example 6.

57 kg. of ammonia is introduced into the disintegration mixture under intensive stirring. A hot saturated aqueous solution of 132 kg. diammonium phosphate is added to the ammoniating mixture on attaining a pH value of about 3.5, and 9 kg. hydrated magnesium nitrate on attaining a pH value of about 4.9. On reaching a pH value of about 5.9, 250 kg. of technical potassium chloride is added to the ammoniating mixture.

The free flowing mass (pH value 7.0), after a suitable quantity of fines has been added, is granulated and dried in the known manner.

A composite fertilizer with a content of 14% N, 14% $P_2O_5$ and 14% $K_2O$ is obtained. Of the total quantity of phosphorous acid, 98.8% is soluble in ammonium citrate solution.

*Example 9*

290 kg. Morocco phosphate containing 33% $P_2O_5$ is disintegrated at a temperature of 45–50° C. with 540 kg. nitric acid (53%). 47 kg. of ammonia is introduced into the disintegration mixture under intensive stirring. A hot saturated aqueous solution containing 86 kg. of diammonium phosphate and 66 kg. of ammonium sulphate is added to the ammoniating mixture when a pH value of about 2.2 is attained. On reaching a pH value of about 5.0, 12 kg. of crystallized iron(III)-nitrate is added. When a pH value of about 6.2 is attained 250 kg. of technical potassium chloride is added.

The free flowing mass (pH value 6.9), after a suitable quantity of fines has been added, is granulated and dried in the known manner.

A composite fertilizer with a content of 13% N, 13% $P_2O_5$ and 13% $K_2O$ is obtained. Of the total quantity of phosphoric acid, 98.9% is soluble in ammonium citrate solution.

The above representative examples are given as illustrating the invention but without limiting its scope otherwise than by the terms of the following claims.

What we claim is:

1. The process of producing a complex fertilizer containing nitrogen in the form of nitrates and nitrogen in ammoniated form and phosphoric acid in the form of phosphates soluble in ammonium citrate which comprises treating phosphate rock with nitric acid in an amount sufficient to render water soluble practically all the phosphate initially contained in said phosphate rock, introducing into the disintegration mixture ammonia in an amount sufficient to render the mass to a pH not substantially less than pH 7 and during the ammoniation when the pH of the mass is between 2.5 and 6.7, adding to the reaction-mixture from 1 to 5 g-atoms of stabilizing metal ions selected from the group consisting of magnesium-, aluminum-, iron(II)-, and iron (III)-ions and mixtures thereof per each 100 moles of $P_2O_5$ present, adding to the reaction mixture prior to the completion of the ammoniation sufficient ammonium salts selected from the group consisting of ammonium phosphate, ammonium sulphate and mixtures thereof to adjust the mole-ratio of CaO to $P_2O_5$ within the range of from 1.5 to 2.1, exclusive of such calcium which is present as calcium sulphate and calcium fluoride in the initial rock.

2. The process of producing a complex fertilizer containing nitrogen in the form of nitrates and nitrogen in ammoniated form and phosphoric acid in the form of phosphates soluble in ammonium citrate which comprises treating phosphate rock with nitric acid in an amount sufficient to render water soluble practically all the phosphate initially contained in said phosphate rock, introducing into the disintegration mixture ammonia in an amount sufficient to render the mass to a pH not substantially less than pH 7 and during the ammoniation when the pH is between 5.0 and 6.4, adding to the reaction mixture from 1 to 5 g.-atoms of stabilizing metal ions selected from the group consisting of magnesium-, aluminum-, iron(II)-, and iron(III)-ions and mixtures thereof per each 100 moles of $P_2O_5$ present, adding to the reaction mixture prior to the completion of the ammoniation sufficient ammonium salts selected from the group consisting of ammonium phosphate, ammonium sulphate and mixtures thereof to adjust the mole-ratio of CaO to $P_2O_5$ within the range of from 1.5 to 2.1, exclusive of such calcium which is present as calcium sulphate and calcium fluoride in the initial rock.

3. The process of producing a complex fertilizer containing nitrogen in the form of nitrates and nitrogen in ammoniated form and phosphoric acid in the form of phosphates soluble in ammonium citrate which comprises treating phosphate rock with nitric acid in an amount sufficient to render water soluble practically all the phosphate initially contained in said phosphate rock, introducing into the disintegration mixture ammonia in an amount sufficient to render the mass to a pH not substantially less than pH 7 and during the ammoniation when the pH of the mass is between 2.5 and 6.7, adding to the reaction mixture from 2 to 4 g.-atoms of stabilizing metal ions selected from the group consisting of magnesium-, aluminum-, iron(II)-, and iron(III)-ions and mixtures thereof per each 100 moles of $P_2O_5$ present, adding to the reaction mixture prior to the completion of the ammoniation sufficient ammonium salts selected from the group consisting of ammonium phosphate, ammonium sulphate and mixtures thereof to adjust the mole-ratio of CaO to $P_2O_5$ within the range of from 1.5 to 2.1, exclusive of such calcium which is present as calcium sulphate and calcium fluoride in the initial rock.

4. The process of producing a complex fertilizer containing nitrogen in the form of nitrates and nitrogen in ammoniated form and phosphoric acid in the form of phosphates soluble in ammonium citrate which comprises treating phosphate rock with nitric acid in an amount sufficient to render water soluble practically all the phosphate initially contained in said phosphate rock, introducing into the disintegration mixture ammonia in an amount sufficient to render the mass to a pH not substantially less than pH 7 and during the ammoniation when the pH is between 4.5 and 6.5, adding to the reaction mixture from 2 to 5 g.-atoms of stabilizing metal ions selected from the group consisting of magnesium-, aluminum-, iron(II)-, and iron(III)-ions and mixtures thereof per each 100 moles of $P_2O_5$ present, adding to the reaction mixture prior to the completion of the ammoniation sufficient ammonium salts selected from the group consisting of ammonium phosphate, ammonium sulphate and mixtures thereof to adjust the mole-ratio of CaO to $P_2O_5$ within the range of from 1.5 to 2.1, exclusive of such calcium which is present as calcium sulphate and calcium fluoride in the initial rock.

5. The process of producing a complex fertilizer containing nitrogen in the form of nitrates and nitrogen in ammoniated form and phosphoric acid in the form of phosphates soluble in ammonium citrate which comprises treating phosphate rock with nitric acid in an amount sufficient to render water soluble practically all the phosphate initially contained in said phosphate rock, introducing into the disintegration mixture ammonia in an amount sufficient to render the mass to a pH not substantially less than pH 7 and during the ammoniation when the pH is between 3.0 and 6.4, adding to the mass from 2 to 4 g.-atoms of magnesium ions per each 100 moles of $P_2O_5$ present, adding to the reaction mixture prior to the completion of the ammoniation sufficient ammonium salts selected from the group consisting of ammonium phosphate, ammonium sulphate and mixtures thereof to adjust the mole ratio of CaO to $P_2O_5$ within the range of from 1.5 to 2.1 exclusive of such calcium which is present as calcium sulphate and calcium fluoride in the initial rock.

6. The process of producing a complex fertilizer containing nitrogen in the form of nitrates and nitrogen in ammoniated form and phosphoric acid in the form of phosphates soluble in ammonium citrate which comprises treating phosphate rock with nitric acid in an amount sufficient to render water soluble practically all the phosphate initially contained in said phosphate rock, introducing into the disintegration mixture ammonia in an amount sufficient to render the mass to a pH not substantially less than pH 7 and during the ammoniation when the pH is between 5.4 to 6.4, adding to the mass from 2 to 4 g.-atoms of aluminum ions per each 100 moles of $P_2O_5$ present, adding to the reaction-mixture prior to the completion of the ammoniation sufficient ammonium salts selected from the group consisting of ammonium phosphate, ammonium sulphate and mixtures thereof to adjust the mole ratio of CaO to $P_2O_5$ within the range of from 1.5 to 2.1 exclusive of such calcium which is present as calcium sulphate and calcium fluoride in the initial rock.

7. The process of producing a complex fertilizer containing nitrogen in the form of nitrates and nitrogen in ammoniated form and phosphoric acid in the form of phosphates soluble in ammonium citrate which comprises treating phosphate rock with nitric acid in an amount sufficient to render water soluble practically all the phosphate initially contained in said phosphate rock, introducing into the disintegration mixture ammonia in an amount sufficient to render the mass to a pH not substantially less than pH 7 and during the ammoniation when the pH is between 5.4 to 6.4, adding to the mass from 2 to 4 g.-atoms of iron(II)-ions per each 100 moles of $P_2O_5$ present, adding to the reaction mixture prior to the completion of the ammoniation sufficient ammonium salts selected from the group consisting of ammonium phosphate, ammonium sulphate and mixtures thereof to adjust the mole ratio of CaO to $P_2O_5$ within the range of from 1.5 to 2.1 exclusive of such calcium which is present as calcium sulphate and calcium fluoride in the initial rock.

8. The process of producing a complex fertilizer containing nitrogen in the form of nitrates and nitrogen in ammoniated form and phosphoric acid in the form of phosphates soluble in ammonium citrate which comprises treating phosphate rock with nitric acid in an amount sufficient to render water soluble practically all the phosphate initially contained in said phosphate rock, introducing into the disintegration mixture ammonia in an amount sufficient to render the mass to a pH not substantially less than pH 7 and during the ammoniation when the pH is between 5.4 to 6.4, adding to the mass from 2 to 4 g.-atoms of iron(III)-ions per each 100 moles of $P_2O_5$ present, adding to the reaction-mixture prior to the completion of the ammoniation sufficient ammonium salts selected from the group consisting of ammonium phosphate, ammonium sulphate and mixtures thereof to adjust the mole ratio of CaO to $P_2O_5$ within the range of from 1.5 to 2.1, exclusive of such calcium which is present as calcium sulphate and calcium fluoride in the initial rock.

9. The process of producing a complex fertilizer containing nitrogen in the form of nitrates and nitrogen in ammoniated form and phosphoric acid in the form of phosphates soluble in ammonium citrate which comprises treating phosphate rock with nitric acid in an amount sufficient to render water soluble practically all the phosphate initially contained in said phosphate rock, introducing into the disintegration mixture ammonia in an amount sufficient to render the mass to a pH not substantially less than pH 7 and during the ammoniation when the pH of the mass is between 2.5 and 6.7, adding to the reaction mixture from 1 to 5 g.-atoms of stabilizing metal ions selected from the group consisting of magnesium-, aluminum-, iron(II)- and iron(III)-ions and mixtures thereof per each 100 moles of $P_2O_5$ present, adding to the reaction mixture prior to the completion of the ammoniation sufficient ammonium salts selected from the group consisting of ammonium phosphate, ammonium sulphate and mixtures thereof to adjust the mole-ratio of CaO to $P_2O_5$ within the range of from 1.5 to 2.1, exclusive of such calcium which is present as calcium sulphate and calcium fluoride in the initial rock, during the ammoniation at a pH-value between 5.5 and 6.4, incorporating a potassium salt, and after completion of ammoniation adding fine particles of the resultant product, granulating the mixture and drying.

References Cited in the file of this patent

UNITED STATES PATENTS

| | | |
|---|---|---|
| 2,738,265 | Nielsson | Mar. 13, 1956 |
| 2,739,054 | Andres et al. | Mar. 20, 1956 |
| 2,769,703 | Andres et al. | Nov. 6, 1956 |
| 2,769,704 | Andres et al. | Nov. 6, 1956 |
| 2,783,139 | Datin | Feb. 26, 1957 |
| 2,845,340 | Karbe et al. | July 29, 1958 |